United States Patent [19]
Ernest

[11] Patent Number: 4,977,129
[45] Date of Patent: Dec. 11, 1990

[54] AUTO EXHAUST CATALYST COMPOSITION HAVING LOW H₂S EMISSIONS AND METHOD OF MAKING THE CATALYST

[75] Inventor: Michael V. Ernest, Baltimore, Md.

[73] Assignee: W. R Grace & Co.-Conn., New York, N.Y.

[21] Appl. No.: 322,444

[22] Filed: Mar. 13, 1989

[51] Int. Cl.⁵ .................. B01J 21/06; B01J 21/08; B01J 23/58; B01J 23/60
[52] U.S. Cl. ................... 502/330; 502/207; 502/213; 502/243; 502/328; 502/329; 423/213.5
[58] Field of Search ........... 502/330, 207, 213, 243, 502/328, 329; 423/213.5

[56] References Cited

U.S. PATENT DOCUMENTS

| | | | |
|---|---|---|---|
| 4,008,180 | 2/1977 | Rausch | 502/330 X |
| 4,207,169 | 6/1980 | Courty et al. | 502/330 X |
| 4,221,738 | 9/1980 | Imai | 502/330 X |
| 4,237,030 | 12/1980 | Noguchi et al. | 502/334 X |
| 4,294,726 | 10/1981 | Bozon et al. | 252/462 |
| 4,369,132 | 1/1983 | Kinoshita et al. | 252/466 PT |
| 4,458,098 | 7/1984 | Antos | 502/329 X |
| 4,463,104 | 7/1984 | Antos et al. | 502/213 |
| 4,497,783 | 2/1985 | Barber | 423/213.5 |
| 4,550,097 | 10/1985 | Drake | 502/328 X |
| 4,591,580 | 5/1986 | Kim et al. | 502/303 |
| 4,680,282 | 7/1987 | Blanchard et al. | 502/304 |
| 4,780,447 | 10/1988 | Kim et al. | 502/243 |

FOREIGN PATENT DOCUMENTS 2431768 2/1974 Fed. Rep. of Germany .

OTHER PUBLICATIONS

"Ceria Promoted Three-Way Catalysts for Auto Exhaust Emission Control," G. Kim, I&EC Product Research & Development, 1982, 21, 267.

*Primary Examiner*—W. J. Shine
*Attorney, Agent, or Firm*—Edward J. Cabic

[57] ABSTRACT

A catalyst suitable for use as a three-way catalyst having low H₂S emissions for emission control and with substantially no ceria present is made with a refractory oxide particle or powder support having deposited thereon about 0.5–20% by weight of a non-rate earth oxide stabilizer, at least 0.5 to about 5% by weight of an alkali metal oxide as a promoter, and a catalytically-effective amount of one or more platinum group metals. The preferred refractory oxide is alumina and the non-rare earth oxide stabilizer can be an oxide such as $ZrO_2$, $MgO$, $CaO$, $SnO$, $CaO$, $Y_2O_3$, $TiO_2$, $ZnO$, $B_2O_3$, $P_2O_5$, $SnO_2$, $Bi_2O_3$, or $SiO_2$ with the preferred oxide being zirconia.

24 Claims, 2 Drawing Sheets

AUTO EXHAUST CATALYST COMPOSITION HAVING LOW $H_2S$ EMISSIONS AND METHOD OF MAKING THE CATALYST

BACKGROUND OF THE INVENTION

1. Field of the Invention

This invention relates to a catalyst for use in auto emission control which has improved, lower $H_2S$ emissions while serving as a three-way catalyst (TWC).

2. Description of the Previously Published Art

With the arrival of the new "High Tech" auto exhaust catalysts coupled with the new operating conditions of the current state-of-the-art engine air/fuel management systems, there has resulted a new emission problem. That problem emission is $H_2S$. It is responsible for the rotten egg odor which occurs after certain modes of operation (e.g., sudden braking and quick starting). Additives such as nickel have been added to conventional catalyst compositions which consist typically of platinum group metals supported on a rare earth oxide promoted alumina. Such rare earth oxide and Ni compositions are currently in commercial use. While nickel is effective in lowering $H_2S$ emissions, it is a suspected human carcinogen. Thus nickel may at some time be restricted in its use because of the potential threat to the environment as well as to public health. Some West European countries have not recommended its use. My approach is to formulate catalysts with additives which do not pose such a threat to the public health and the environment.

While rare earths and especially cerium have been used commercially in auto emission control catalysts for a number of years, these catalysts when used in conjunction with the new closed loop air/fuel management systems have been found to produce significant $H_2S$ emissions. This is most likely a result of ceria's efficacy for storing sulfur and for generating hydrogen via the water gas shift reaction under fuel rich ($O_2$ deficient) conditions the latter having been pointed out by G. Kim in "Ceria Promoted Three-Way Catalysts for Auto Exhaust Emission Control", I&EC Product Research & Development, 1982, 21, 267. These $H_2S$ emissions have reached levels that the consumers feel are objectionable.

All of the more common rare earths (viz., La, Ce, Nd, and Pr) to varying degree when incorporated into auto exhaust catalysts generate undesirable levels of $H_2S$. Catalysts lacking cerium oxide as a major component generally do not have sufficient activity to catalytically remove carbon monoxide under the conditions which the current state-of-the-art engines operate. That is the reason that higher levels of cerium oxide and other rare earth oxides have been incorporated into the so-called "High Tech" catalysts. "High Tech" performance has led to increased incidence of abnormally high levels of $H_2S$ emission. My desire has been to achieve satisfactory carbon monoxide removal, but without the creation of new pollution problems.

3. Objects of the Invention

It is an object of this invention to obtain a catalytic composition which produces low $H_2S$ emissions and is capable of meeting the EPA requirements for CO, HC, and NOx emissions.

It is further object of this invention to achieve good CO and HC conversions under fuel rich, oxygen deficient conditions, with minimal $H_2S$ emissions.

It is further object of this invention to obtain a catalytic composition which is relatively non-toxic, and which does not pose potential threats to public health and the environment as current nickel containing catalysts may do.

It is further object of this invention to obtain a catalyst suitable for use as a three-way catalyst having low $H_2S$ emissions for emission control which has substantially no ceria present and which has a formed refractory oxide particle or refractory oxide powder support which has deposited thereon a non-rare earth oxide stabilizer, an alkali metal oxide promoter, and one or more platinum group metals as the catalyst metals.

It is further object of this invention to make a catalyst which is suitable for use as a three-way catalyst with low $H_2S$ emissions for emission control by impregnating a refractory oxide support with a solution containing either a non-rare earth stabilizer salt or a non-rare earth stabilizer salt plus an alkali metal compound; heating the impregnated support to at least decompose the non-rare earth stabilizer salt; and applying one or more catalytic platinum group metals and optionally at least one alkali metal promoter.

It is further object of this invention to treat exhaust gases so as to reduce $H_2S$ emissions by passing the exhaust gases over a catalyst suitable for use as a three-way catalyst having low $H_2S$ emissions for emission control which has substantially no ceria present according to this invention.

These and further objects will become apparent as the description of the invention proceeds.

SUMMARY OF THE INVENTION

It has been found that greatly lowered $H_2S$ emissions and acceptable catalyst performance for control of CO, HC, and NOx emissions can be obtained even if the rare earths and especially ceria are substantially eliminated from auto exhaust catalyst compositions. In place of the rare earths a catalyst is formed from a refractory oxide particle or refractory oxide powder support having deposited thereon about 0.5–20% by weight of a non-rare earth oxide stabilizer, at least about 0.5 to about 5% by weight of an alkali metal oxide as a promoter, and a catalytially-effective amount of one or more platinum group metals selected from the group of Pt, Pd, Ir, Rh, or mixtures thereof; binary mixtures of Pt-Pd, Pt-Rh, or Pd-Rh; and tertiary mixtures of Pt-Pd-Rh. The non-rare earth oxide stabilizer is preferably one or more of the oxides of $ZrO_2$, MgO, CaO, SrO, BaO, $Y_2O_3$, $TiO_2$, ZnO, $B_2O_5$, $P_2O_5$, $SnO_2$, $Bi_2O_3$ and $SiO_2$ with $ZrO_2$ being preferred. The refractory oxide is preferably aluminum oxide. The components of the catalyst can be deposited in various combinations and orders with the non-rare earth oxide stabilizer generally being added first. These catalysts can be used to treat exhaust gases so as to reduce $H_2S$ emissions while still possessing good three-way catalyst performance.

DESCRIPTION OF THE PREFERRED EMBODIMENTS

Figure 1:
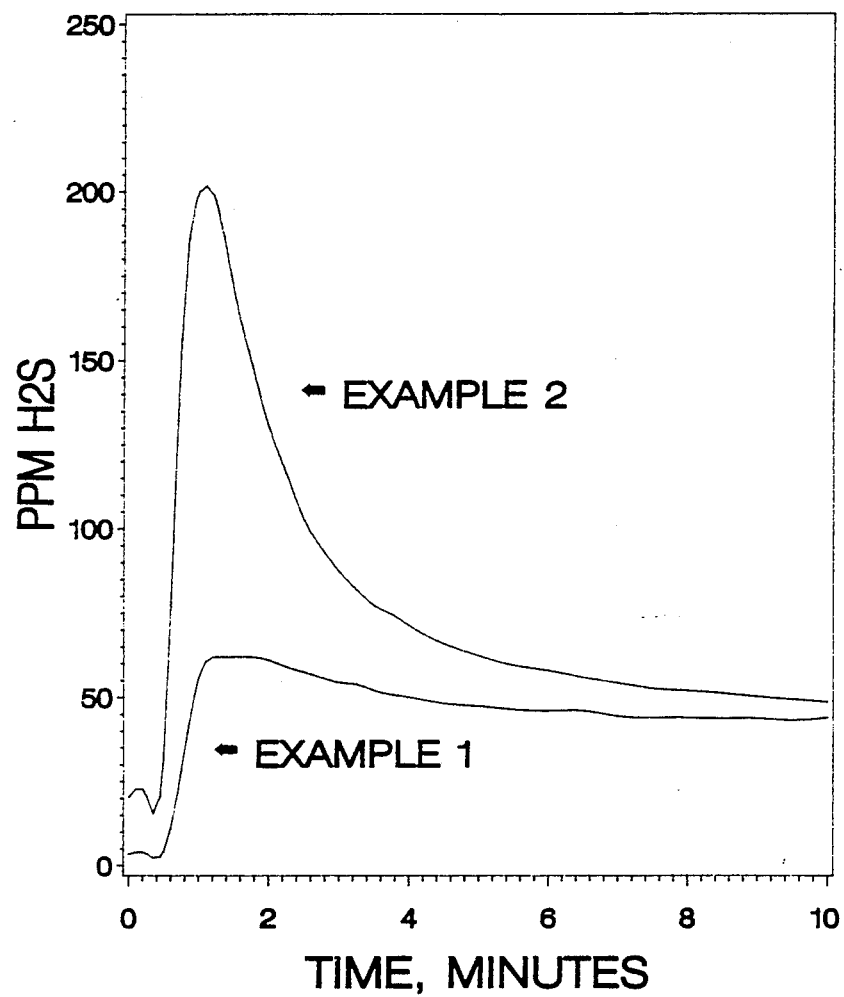
FIG. 1 is the results of the $H_2S$ emission test for the catalysts of Examples 1 and 2.

The non-rare earth oxide (preferably alumina) stabilizer, which can be used include one or more of the following metal oxides: zirconia ($ZrO_2$); the alkaline earth oxides which are MgO, CaO, SrO, and BaO; and the following additional oxides $SiO_2$, $Y_2O_3$, $TiO_2$, ZnO, $B_2O_5$, $SnO_2$, or $Bi_2O_3$. This non-rare earth oxide stabilizer can be present in an amount of about 0.5–20% based on the weight of the catalyst and preferably from about 1–5%.

The promoters used in the catalyst are one or more alkali earth oxides which are $Li_2O$, $Na_2$, $K_2O$, or $Cs_2O$. This alkali metal oxide is present in an amount from about at least about 0.5% to 5% based on the weight of the catalyst and preferably from at least about 0.5% to 2%.

The noble metals include one or more of Pt, Pd, Rh, Ir, Ru or mixtures thereof; especially mixtures of Pt-Pd, Pt-Rh, or Pd-Rh; and tertiary mixtures of Pt-Pd-Rh.

The platinum group metals can be provided in the form of water soluble platinum group metal compounds such as sulfito complexes of platinum group metals, chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

The catalyst composition can be applied equally well on powdered refractory oxide particles such as alumina particles to make a washcoat for a monolithic catalyst or the refractory oxide such as alumina can be in a pelleted catalyst form such as spheres, beads, pellets, tablets or extrusions. The preferred B.E.T. surface area for the refractory oxide support is from 50–250 $m^2/g$. When forming a monolithic catalyst, the weight percentages for the various additives are based on the weight of the washcoat mixture and not upon the weight of the inert support monolith. For the particle form, the preferred size is to have a mesh size between 4–10 U.S. mesh. For the powder embodiment, the preferred powder size is to have an average particle size of 100 microns or less. The preferred B.E.T. surface area for the catalyst is from 50 to 250 $m^2/g$.

The catalyst can be used for stationary source emissions as well as mobile source emissions.

There are at least three embodiments by which the non-rare earth stabilizer, the alkali metal and the catalytic noble metals can be applied to the alumina support. They will be referred to as Embodiments A, B, and C.

Embodiment A—Stabilizer First and Alone

The non-rare earth stabilized catalyst, which is especially suitable for use as a three-way catalyst for control of auto emissions, is preferably made by impregnating with a solution containing a non-rare earth compound, a refractory oxide support, preferably an alumina support, which is either in a powder form or as formed particulates. The aluminum oxide is in a transition form. The transition phases are chi, gamma, eta, delta, theta, iota, and kappa. The particularly preferred forms are gamma, eta, delta and theta. In general, the aluminum oxide will have been heated to at least 300° C. because otherwise it will not be in the transition form.

The impregnated support is optionally dried at 100°–200° C. and then is heated to at least decompose the non-rare earth compound so as to obtain a non-rare earth oxide impregnated support. In a preferred embodiment the heating is done at a temperature of from about 400° to 1100° C. to thermally stabilize the support. The temperature for heating will depend on the precursor used to form the transition alumina. For alumina made from boehmite the temperature is preferably about 400–700° C. whereas for alumina made from pseudoboehmite the temperature is preferably about 800–1100° C. The separate drying step is optional because in a large plant operation as the impregnated support is being sent into a calciner, it will automatically be given a drying operation as it enters the calciner where the initial temperature will be lower. Next, one or more alkali metals and one or more platinum group metals are applied by either one of the two procedures.

In the first procedure (A1) the non-rare earth stabilized alumina support is impregnated with a first noble metal plus an alkali metal compound. The impregnated material is then dried at ambient temperature for 0–4 hours and at about 100–200° C. and a second noble metal solution is added. Again the impregnated material is dried at ambient temperature for 0–4 hours and at about 100–200° C.

In the second embodiment (A2) a combination of two or more noble metals and the alkali metal compound are impregnated in a single impregnation of the non-rare earth oxide stabilized alumina support. The impregnated material is then dried at ambient temperature for 0–4 hours and at about 100–200° C.

Embodiment B—Stabilizer and Alkali Metal Together

In this embodiment when the non-rare earth stabilizer is applied to the substrate, it is also applied along with the alkali metal. Thus the solution of the stabilizer compound and the alkali metal compound are applied to the substrate and after impregnation the substrate is dried at 100–200° C. It is next activated at 400–1100° C. after which there can be two further possible procedures to apply the noble metals. In one procedure (B1) the noble metal solution is applied and the impregnated material is then dried at 100–200° C. In the other procedure (B2) the noble metal is applied with some additional alkali metal which can be either a different alkali metal or some more of the same alkali metal. After impregnation the material is again dried at 100–200° C.

Activation for Embodiments A and B

Finally the impregnated catalyst made by either Embodiment A or B is activated at a temperature of about 300°–650° C. by one of three procedures. The first is to just heat the treated support in air within this temperature range. The second procedure, and the more preferred reductive activation, is to heat within this temperature range in the presence of hydrogen which is generally 3–5 vol % $H_2$ for practiced commercial applications and more preferably at 550°–650° C. The third procedure is to carry out the second hydrogen reduction procedure in the presence of 20–50 vol. % steam along with 3–5 vol. % hydrogen.

Embodiment C—Alkali Metal After Noble Metals

In this embodiment the substrate is first impregnated with the non-rare earth stabilizer and the material is dried at 100–200° C. as in the first step of Embodiment A. It is then activated at a temperature of between 400–1100° C. and it can then be further treated either one of two procedures.

In the first procedure (C1) one or more noble metals are added to the stabilized material and the material is dried at 100–200° C. Then the material is given an activation treatment by one the three activation procedures described above. After activation, an additional impregnation is conducted with an alkali metal and the material is again ambient temperature for 0-4 hours and at about 100-200° C. At this point the material is ready for use. However, there can be an additional optional activation which would be done in air and at 300-650° C.

In the other procedure (C2), one or more noble metals are applied to the non-rare earth oxide stabilized alumina by impregnation and the material is ambient temperature for 0-4 hours and at about 100-200° C. Then a further alkali metal impregnation is conducted and again the impregnated product is dried at 100-200° C. Finally, activation occurs by one of the three techniques discussed above to obtain the final product.

In those catalysts which are made with Na, K, or Cs, the preferred method is add the alkali metal along with or after the noble metals are applied, although one can incorporate them with the $ZrO_2$ or in a sequential application.

It is prefered for lithia to be added with the zirconia, but it can be added at a later step.

Having described the basic aspects of my invention, the following examples are given to illustrate specific embodiments thereof.

EXAMPLE 1

This example describes the preparation of a catalyst of this invention having low $H_2S$ emissions and good catalyst performance when compared to a commercially available catalyst having the same noble metals, and loading and which is heavily loaded with cerium oxide.

9,265 grams of −5+8 U.S. mesh alumina beads supplied by Rhone Poulenc as SCM-99XT having a compacted bulk density of 0.56 grams/cc, a water pore volume of 0.73 cc/gram and a total volatile content of 2.61% were impregnated with a zirconyl nitrate solution. The zirconyl nitrate solution was prepared by diluting 923.77 grams of a commercially available zirconyl nitrate solution which has the equivalent of 20.034 grams of zirconium oxide per 100 grams of said solution to a total volume of 6,425 milliliters. This impregnating solution had a pH of 1.05. It was applied by spraying through atomizing nozzles. The impregnated beads were then allowed to stand one hour in the wet state, followed by drying at 135° C. for 16 hours. The support was further heated at 704° C. for one hour. This represents the incorporation of 2% zirconium oxide by weight. At this point the support has a compacted bulk density of 0.57 grams/cc, a water pore volume of 0.73 cc/gram, and a total volatile content of 0.57%.

The above zirconia containing substrate (9,261 grams) was impregnated with a sulfited palladium nitrate solution prepared by diluting 67.92 grams of ammonium bisulfite (48% weight concentration) to 5 liters with deionized water. 83.1286 grams of palladium nitrate (8.9129% palladium concentration) was added, followed by 200.48 grams of potassium nitrate (99.8% assay). The solution was further diluted to 6423 milliliters. The solution which had a pH of 1.55 was impregnated onto the beads in a rotating vessel via atomizing spray. The wet beads were allowed to stand in the wet state for two hours. Following the wet hold the beads were dried in a mechanical convection oven at 135° C. for 16 hours. The beads were then reimpregnated with a mixed platinum and rhodium sulfite solution. The rhodium sulfite solution was prepared by reacting 11.224 grams of rhodium chloride solution (5.501% rhodium concentration) with 16.00 grams of sulfurous acid (7.57% $SO_2$ weight concentration) at a rhodium titer of 2 grams per liter at 60° C. for two hours. The cooled rhodium solution was then combined with 25.9524 grams of $(NH_4)_6Pt(SO_3)_4$ solution (9.51636% platinum concentration) and then further diluted to 6,085 milliliters with deionized water. The pH was 2.70. This solution was likewise applied by atomizing spray followed by a two hour wet hold and then drying at 135° C. for 16 hours.

This catalyst was then reduced at 649° C. for one hour in a flow of 40.2% steam with the balance being a mixture of 5% hydrogen and 95% nitrogen. The level of potassia corresponds to 1% by weight of the overall catalyst composition. This sample will be identified as Catalyst 1. Catalyst 1 has a B.E.T. surface area of 112 $m^2/g$.

EXAMPLE 2

A catalyst of commerce which was manufactured by another catalyst supplier was obtained and used as the reference catalyst. This represents the "High Tech" high $H_2S$ emission catalyst which we want to replace with a low $H_2S$ emitting version.

This catalyst has the same noble metals loading (volume basis) as the catalyst described in Example 1. Furthermore, it is supported on the same alumina beads from same manufacturer as used in Example 1. This catalyst serves as commercial reference and is identified as Catalyst 2. Chemical analysis via ICP (Inductively Coupled Plasma) of this catalyst reveals that it contains 7.3% cerium oxide and 2.0% lanthanum oxide as the primary active base metals components.

EXAMPLE 3

This example describes the preparation of a catalyst of this invention having low $H_2S$ emissions and good catalyst performance for CO as compared to a commercially available catalyst having the same noble metal loading, but which is heavily loaded with cerium oxide.

9,259 grams of −5+8 U.S. mesh alumina beads supplied by Rhone Poulenc as SCM-99XT having a compacted bulk density of 0.56 grams/cc, a water pore volume of 0.73 cc/gram and a total volatile content of 2.62% were impregnated with a zirconium ammonium carbonate solution. The zirconium solution was prepared by diluting 921.56 grams of a commercially available zirconium ammonium carbonate solution which had the equivalent of 20.067 grams of zirconium oxide per 100 grams of said solution to a total volume of 6,083 milliliters. This impregnating solution had a pH of 9.04. It was applied by spraying through atomizing nozzles. The impregnated beads were then allowed to stand one hour in the wet state, followed by drying at 135° C. for 16 hours. The support was further heated at 704° C. for one hour. This represents the incorporation of 2% zirconium oxide by weight. At this point the support has a compacted bulk density of 0.57 grams/cc, a water pore volume of 0.75 cc/gram, and a total volatile content of 0.225%.

The above zirconia containing substrate (9,196 grams) was impregnated with a sulfited palladium nitrate solution prepared by diluting 34.84 grams of ammonium bisulfite (48% weight concentration) to 5 liters with deionized water, followed by 83.1286 grams of palladium nitrate (8.9129% palladium concentration) and then 411.62 grams of potassium nitrate (99.8% assay). The solution was further diluted to 6552 milliliters. The solution which had a pH of 1.78 was impregnated onto the beads in a rotating vessel via atomizing spray. The wet beads were allowed to stand in the wet state for two hours. Following the wet hold the beads were dried in a mechanical convention oven at 135° C. for 16 hours. The beads were then reimpregnated with a mixed platinum and rhodium sulfite solution. The rhodium sulfite solution was prepared by reacting 21.817 grams of rhodium chloride solution (5.501% rhodium concentration) with 31.1 grams of sulfurous acid (7.57% $SO_2$ weight concentration) at a rhodium titer of 2 grams per liter of 60° C. for two hours. The cooled rhodium solution was then combined with 100.894 grams of $(NH_4)_6Pt(SO_3)_4$ solution (9.51636% platinum concentration) and then further diluted to 6,207 milliliters with deionized water. The pH was 2.81. This solution was likewise applied by atomizing spray followed by a two hour wet hold and then drying at 135° C. for 16 hours.

This catalyst was then reduced at 649° C. for one hour in a flow of 40.6% steam with the balance being a mixture of 5% hydrogen and 95% nitrogen. The level of potassia corresponds to 2% by weight of the overall catalyst composition. This sample will be identified as Catalyst 3. Catalyst 3 has a B.E.T. surface area of 108 $m^2/g$.

EXAMPLE 4

This is an example of a platinum rich noble metals formulation currently used in the automotive industry for exhaust emissions control.

A catalyst of commerce which was manufactured by another catalyst supplier was obtained and used as the reference catalyst which represents the "High Tech" high $H_2S$ emission catalyst which we want to replace with a low $H_2S$ emitting version. This catalyst has the same noble metals loading (volume basis) as the catalyst described in Example 3. Furthermore, it is supported on the same alumina beads as used in Example 2. This catalyst serves as a commercial reference and is identified as Catalyst 4. Chemical analysis via ICP (Inductively Coupled Plasma) of this catalyst reveals that it contains 6.7% cerium oxide as the primary active component.

EXAMPLE 5

$H_2S$ testing is carried out on the samples described in Examples 1–4 in laboratory bench scale equipment according to the following protocol. An 8.5 cc sample in a tubular quartz reactor with 2.5 cm I.D. is heated to 550° C. with only nitrogen gas flowing. Once 550° C. is reached the stoichiometric exhaust as described below in Table I was introduced and maintained for 15 minutes. At the end of the 15 minute stoichiometric treatment, by means of a solenoid valving system the exhaust gas feed is instantaneously changed to the strongly reducing condition described also in Table I.

TABLE I

| Laboratory $H_2S$ Test Conditions | | |
|---|---|---|
| Catalyst Charge Volume, $cm^3$ | 8.5 | |
| Total Gas Flow Rate, l(NTP)/min | 2.83 | |
| GHSV, $hr^{-1}$ | 20,000 | |
| | Stoichiometric Condition (Compondt = 0.99) | Rich Condition (R = 0.025) |
| CO | 0.375 | 5.00 |
| $H_2$ | 0.125 | 1.67 |
| $HC(C_3H_6/C_3H_8 = 3)$ | 0.0400 | 0.0382 |
| $O_2$ | 0.34 | 0.0 |
| $CO_2$ | 14.5 | 13.9 |
| $H_2O$ | 13.0 | 12.4 |
| $SO_2$ | 0.0035 | 0.0033 |
| NO | 0.185 | 0.177 |
| $N_2$ | Balance | Balance |
| Bed Temperature, °C. | 550 | 550 |
| Delta P, inches $H_2O$ | 15 | 15 |
| Exposure time, minutes | 15 | 10 |

The exhaust gas is analyzed for $H_2S$ emissions by passing the entire exhaust into a heated (100° C.) two stage dilution system capable of reducing the $H_2S$ concentration by as much as 400 fold. The usual dilution ratio is 200 times. The hot diluted gas stream is continuously sampled during the 10 minute reducing cycle via a Tracor-Atlas model 825RD $H_2S$ analyzer. The output from the analyzer is recorded. At least three such lean-reducing cycles are carried out on each catalyst. The more meaningful assessment of $H_2S$ emissions behavior is carried out after the catalyst has been exposed to a typical exhaust gas composition for some period of time.

This conditioning treatment essentially brings all the catalysts to an equal footing as far as thermal history is concerned and additionally introduces and stores sulfur as what might occur, for example, during a high speed cruise. The conditioning treatment is carried out in a simulated auto exhaust stream. The auto exhaust stream is simulated in a pulse flame combustion apparatus (a typical description of which has been presented by K. Otto, etal. *APCA Journal*, volume 24, No. 6., June 1974) which burns isooctane fuel which has been doped with typical exhaust contaminants such as lead, zinc, phosphorus, and sulfur. The combustion is carried out a stoichiometric air/fuel ratio. 18 cc of catalyst is treated for three hours at 700° C. at a gas hourly space velocity of 16,000 $hr^{-1}$.

Figure 2:
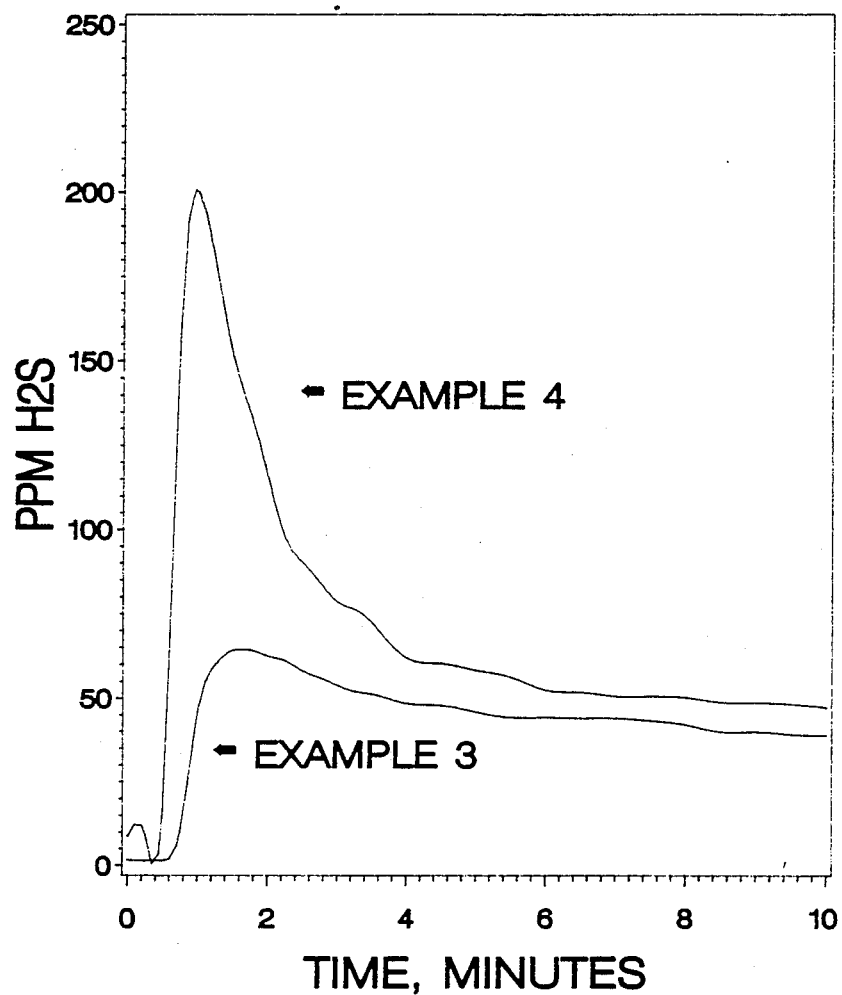
FIG. 2 is the results of the $H_2S$ emission test for the catalysts of Examples 3 and 4.

At the end of the conditioning treatment, the catalyst is removed and a portion analyzed in a LECO Model SC132 sulfur analyzer to determine the sulfur content. Another portion is used to characterize the $H_2S$ emissions. The $H_2S$ emissions characteristics of catalysts (1) and (2) are compared graphically in FIG. 1. The $H_2S$ emissions characteristics of catalyst (3) and (4) are compared graphically in FIG. 2. These data show the effectiveness of the catalysts of this invention for minimizing $H_2S$ emissions despite the comparable levels of sulfur stored on the catalyst. Below in Table II is a tabulation of the sulfur levels prior to $H_2S$ emissions testing, and what is defined as the peak $H_2S$ release for the initial emissions test (pass 1) of catalyst Examples 1–4.

TABLE II

| | H$_2$S Emissions Test Data | |
|---|---|---|
| Example | % Sulfur as Sulfate (a) | Peak H$_2$S Release (b) |
| 1 | 0.41 | 151 |
| 2 | 0.38 | 526* |
| 3 | 0.53 | 122 |
| 4 | 0.34 | 524 |

*Peak emission exceeded instrument scale limit.
(a) Determined by LECO Model SC132.
(b) Peak H$_2$S emission (pass 1) in ppm per initial % sulfate content.

EXAMPLE 6

In addition to being characterized by low H$_2$S emissions, the catalyst must have acceptable TWC performance. TWC performance is assessed using the test procedure described in Society of Automotive Engineers paper 800083 entitled *Development of More Active and Durable Automotive Catalysts,* by M. V. Ernest and G. Kim, 1980. The fresh TWC activities of the catalysts of this invention along with the activities of the catalysts of commerce having the same noble metals and loading are summarized in Table III.

TABLE III

| | Fresh TWC Activities | | | | | | | | | | | |
|---|---|---|---|---|---|---|---|---|---|---|---|---|
| | Catalyst Components | | | | | | | | | | | |
| | 1 2% ZrO$_2$ 1% K$_2$O | | | 2 7.3% CeO$_2$ 2.0% LaO$_2$ | | | 3 2% ZrO$_2$ 2% K$_2$O | | | 4 6.7% CeO$_2$ | | |
| Conversion at R Value* | HC | CO | NO | HC | CO | NO | HC | CO | NO | HC | CO | NO |
| 0.85 | 96 | 87 | 100 | 84 | 88 | 98 | 96 | 87 | 100 | 84 | 88 | 98 |
| 1.00 | 98 | 92 | 100 | 92 | 94 | 98 | 98 | 92 | 100 | 92 | 94 | 98 |
| 1.15 | 98 | 98 | 99 | 96 | 99 | 93 | 98 | 98 | 99 | 96 | 99 | 93 |

*R Value is a measure of air/fuel ratio defined as follow:

$$R = \frac{[O_2] + 0.5[NO]}{0.5[CO] + 0.5[H_2] + 4.5[C_3H_6] + 5[C_3H_8]}$$

where the concentration of each gaseous component is in vol.% or mole %. R<1, R=1, and R>1 thus represent net reducing, stoichiometric, and net oxidizing conditions respectively.

Of course, fresh activities must be at an acceptable level, but more importantly the TWC activity must be sustained after longer term exposure to the high temperatures, fuel and lubricant contaminants, and variations in air/fuel ratio which are typical of actual use. This is simulated in the laboratory by employing a modification of the pulse flame testing described previously. This modification involves exposing the catalyst to 800° C. in the simulated exhaust. Every minute out of two the air/fuel ratio is stoichiometric. The other minute involves the injection of additional CO (3%) and O$_2$ (3%) to create elevated surface temperatures which should sinter the active components and render the catalyst less active. This simulated aging treatment is continued for at least 45 hours prior to testing for TWC activity.

A comparison of activities after pulse flame aging of Catalysts 1 and 3 of this invention compared with those products of commerce Catalysts 2 and 4 which are utilized as reference catalysts are shown in Table IV below.

TABLE IV

| | TWC Activities After 45 Hours Pulse Flame Aging | | | | | | | | | | | |
|---|---|---|---|---|---|---|---|---|---|---|---|---|
| | Catalyst Components | | | | | | | | | | | |
| | 1 2% ZrO$_2$ 1% K$_2$O | | | 2 7.3% CeO$_2$ 2.0% LaO$_2$ | | | 3 2% ZrO$_2$ 2% K$_2$O | | | 4 6.7% CeO$_2$ | | |
| Conversion at R Value* | HC | CO | NO | HC | CO | NO | HC | CO | NO | HC | CO | NO |
| 0.85 | 58 | 59 | 71 | 62 | 52 | 66 | 60 | 73 | 84 | 62 | 70 | 88 |
| 1.00 | 77 | 80 | 89 | 74 | 68 | 73 | 76 | 88 | 94 | 77 | 84 | 93 |
| 1.15 | 83 | 96 | 84 | 82 | 88 | 71 | 81 | 97 | 82 | 91 | 95 | 95 |

*R Value is a measure of air/fuel ratio defined as follow:

$$R = \frac{[O_2] + 0.5[NO]}{0.5[CO] + 0.5[H_2] + 4.5[C_3H_6] + 5[C_3H_8]}$$

where the concentration of each gaseous component is in vol.% or mole %. R<1, R=1, and R>1 thus represent net reducing, stoichiometric, and net oxidizing conditions respectively.

The data show both of the experimental catalysts are characterized by very low H$_2$S emissions. CO conversions are equal to or better than the commercial catalyst despite the absence of rare earth oxides most notably that of cerium oxide.

It is understood that the foregoing detailed description is given merely by way of illustration and that many variations may be made therein without departing from the spirit of this invention.

What is claimed is:

1. A catalyst suitable for use as a three-way catalyst having low H$_2$S emissions for emission control with no substantial amount of ceria or nickel present comprising a formed refractory oxide particle or refractory oxide powder support having a B.E.T. surface area of 50–250 m$^2$g and having deposited thereon about 0.5–20% by weight of a non-rare earth oxide stabilizer selected from the group consisting of ZrO$_2$, MgO, CaO, SrO, BaO, Y$_2$O$_3$, ZnO, B$_2$O$_3$, P$_2$O$_5$, SiO$_2$ and mixtures thereof; at least about 0.5 to about 5% by weight of an alkali metal oxide as a promoter; and having subsequently deposited thereon a catalytically-effective amount of one or more platinum group metals selected from the group of Pt, Pd, Ir, Rh, or mixtures thereof; binary mixtures of Pt-Pd, Pt-Rh, or Pd-Rh; and tertiary mixtures of Pt-Pd-Rh.

2. A catalyst according to claim 1, wherein the refractory oxide is aluminum oxide.

3. A catalyst according to claim 1, wherein the alkali metal oxide is selected from the group consisting of $Li_2O$, $NA_2O$, $K_2O$, $Cs_2O$, and mixtures thereof.

4. A catalyst according to claim 1, wherein the alkali metal oxide is present in an amount from about at least about 0.5% to 2% based on the weight of the catalyst.

5. A catalyst according to claim 1, wherein said non-rare earth oxide stabilizer is $ZrO_2$.

6. A catalyst according to claim 1, wherein said non-rare earth oxide stabilizer is present in an amount of about 1–5% based on the weight of the catalyst.

7. A catalyst according to claim 1, wherein said formed particle support is selected from the group consisting of beads, pellets, extrusions, tablets, and spheres.

8. A catalyst according to claim 1, wherein said formed particle support has a mesh size of between 4–10 U.S. mesh.

9. A catalyst according to claim 1, wherein said powder support has an average particle size of 100 microns or less.

10. A catalyst according to claim 1, wherein said non-rare earth oxide stabilizer is $ZrO_2$ and said alkali metal oxide is $K_2O$.

11. A method of making a catalyst which is suitable for use as a three-way catalyst with low $H_2S$ emissions for emission control with no substantial amount of ceria or nickel present comprising the steps of
(A) impregnating a refractory oxide support with a solution containing either
   (1) a non-rare earth stabilizer salt which will yield oxides selected from the group consisting of $ZrO_2$, $MgO$, $CaO$, $SrO$, $BaO$, $Y_2O_3$, $ZnO$, $B_2O_3$, $P_2O_5$, $SiO_2$ and mixtures thereof in an amount of 0.5–20% by weight of the refractory oxide support; or
   (2) a non-rare earth stabilizer salt which will yield oxides selected from the group consisting of $ZrO_2$, $MgO$, $CaO$, $SrO$, $BaO$, $Y_2O_3$, $ZnO$, $B_2O_3$, $P_2O_5$, $SiO_2$ and mixtures thereof in an amount of 0.5–20% by weight of the refractory oxide support plus an alkali metal compound;
(B) optionally drying the impregnated support at a temperature of 100–200° C.;
(C) heating the impregnated support at 400–1100° C. to at least decompose the non-rare earth stabilizer salt to obtain a non-rare earth oxide stabilized support;
(D) applying one or more catalytic platinum group metals and optionally at least one alkali metal promoter by either
   (1) impregnating the non-rare earth stabilizer oxide impregnated support from step (C) with solutions bearing one or more platinum group metals and a soluble alkali metal salt solution; or
   (2) impregnating the non-rare earth stabilizer oxide impregnated support from step (C) with solutions bearing one or more platinum group metals when the refractory oxide in step (A) was impregnated with an alkali metal compound; or
   (3)
      (a) impregnating the non-rare earth stabilizer oxide impregnated support from step (C) with solutions bearing one or more platinum group metals;
      (b) air drying the catalyst at temperature for 0–4 hours, and at about 100–200 °C. to dry the catalyst after the impregnation; and
      (c) further impregnating the impregnated support from step (D) (3) (b) with a soluble alkali metal salt solution; or
   (4)
      (a) impregnating the non-rare earth stabilizer oxide impregnated support from step (C) with a solution bearing one or more platinum group metals and a soluble alkali metal salt solution;
      (b) air drying the catalyst at ambient temperature for 0–4 hours, and at about 100–200° C. to dry the catalyst after the impregnation with solutions bearing catalytic metals; and
      (c) further impregnating the impregnated support from step (D)(4)(b) with a solution of one or more platinum group metals;
(E) air drying the catalyst at ambient temperature for 0–4 hours, and at about 100–200° C. to dry the catalyst after the impregnation in step (D); and
(F) activating the catalyst containing the platinum group metals in step (D) at a temperature of about 300–650° C.; and
(G) optionally
   (1) further impregnating the activated catalyst from step (F) with a soluble alkali metal salt solution;
   (2) air drying the catalyst at ambient temperature for 0–4 hours, and at about 100–200° C. to dry the catalyst after the impregnation; and
   (3) optionally further activating the dried catalyst from step (G)(2) in air at 300–650° C.

12. A method according to claim 11, wherein the heating in step (C) is done at a temperature of from about 400° to 1100° C. to thermally stabilize the support.

13. A method according to claim 12, wherein when the support is alumina which has pseudoboehmite as a precursor, then the heating in step (C) is done at a temperature of from about 800–1100° C. to thermally stabilize the support.

14. A method according to claim 12, wherein when the support is alumina which has boehmite as a precursor, then the heating in step (C) is done at a temperature of from about 400–700° C. to thermally stabilize the support.

15. A method according to claim 11, wherein the activation in step (F) is done in the presence of hydrogen.

16. A method according to claim 11, wherein the platinum group metals in step (D) are provided in the form of water soluble platinum group metal compounds which are selected from the group consisting of sulfito complexes of platinum group metals, chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

17. A method according to claim 16, wherein the platinum group metals are provided in the form of sulfito complexes.

18. A method according to claim 11, wherein the refractory oxide is alumina.

19. A method according to claim 11, wherein the non-rare earth stabilizer salt is a zirconium salt.

20. A method according to claim 19, wherein the alkali metal compound is a potassium compound.

21. A catalyst made by the method of claim 11.

22. A catalyst made by the method of claim 19.

23. A catalyst made by the method of claim 20.

24. A method according to claim 11, wherein the refractory oxide support is an aluminum oxide support in the transition form.

* * * * *